United States Patent [19]
Aulisa

[11] 3,844,950
[45] Oct. 29, 1974

[54] ROTARY SKIMMER
[75] Inventor: Gerard D. Aulisa, Claymont, Del.
[73] Assignee: Sun Oil Company of Pennsylvania, Philadelphia, Pa.
[22] Filed: Feb. 20, 1973
[21] Appl. No.: 333,831

[52] U.S. Cl............. 210/170, 210/DIG. 21, 210/242
[51] Int. Cl........................................... E02b 15/04
[58] Field of Search ...... 210/83, 242, DIG. 21, 525, 210/528, 169, 170; 15/1.7

[56] References Cited
UNITED STATES PATENTS

| | | | |
|---|---|---|---|
| 2,633,989 | 4/1953 | Helley et al...................... | 210/525 X |
| 3,032,044 | 5/1962 | Pansini.............................. | 15/1.7 X |
| 3,348,690 | 10/1967 | Comelissen.................. | 210/DIG. 21 |
| 3,500,841 | 3/1970 | Logan.......................... | 210/DIG. 21 |
| 3,616,468 | 11/1971 | Takacs............................. | 210/169 |
| 3,661,264 | 5/1972 | Peterson ..................... | 210/DIG. 21 |
| 3,730,346 | 5/1973 | Prewitt......................... | 210/DIG. 21 |
| 3,762,169 | 10/1973 | Graham ....................... | 210/DIG. 21 |

*Primary Examiner*—Theodore A. Granger
*Attorney, Agent, or Firm*—George L. Church; Donald R. Johnson; Frank A. Rechif

[57] ABSTRACT

An elongated skimming blade is mounted for rotation, about a substantially vertical axis, across the surface of a liquid, and is rotated about this axis by means of a suitable propulsion device. A collection trough attached to the blade serves as an accumulation means for the skimmed material. A float whose buoyancy is adjustable maintains the blade in a predetermined position relative to the liquid surface, the float being anchored to the bed of the body of water being skimmed. The whole constitutes a portable rotary skimmer.

3 Claims, 5 Drawing Figures

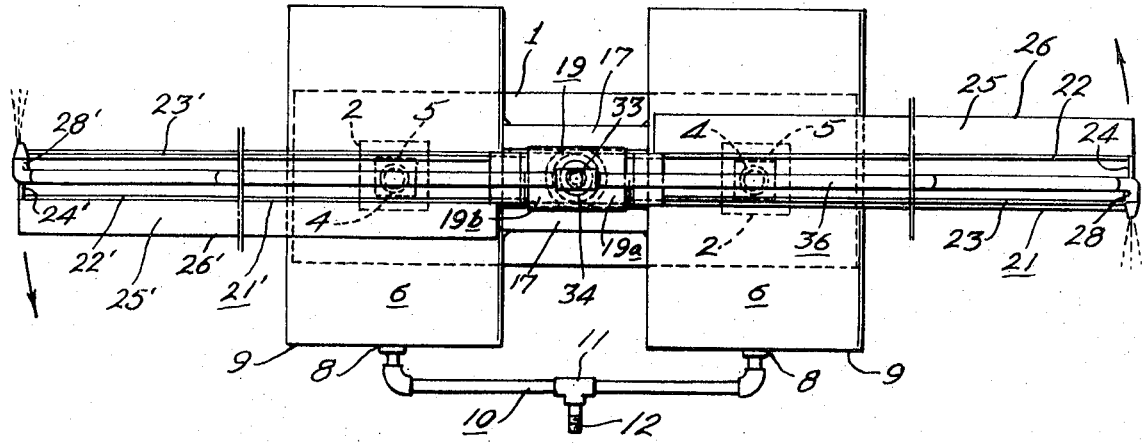
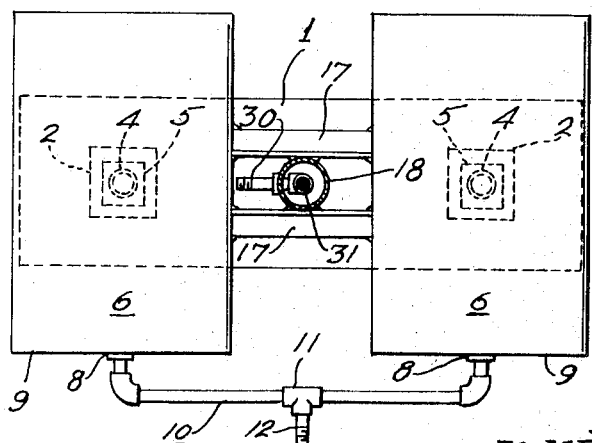
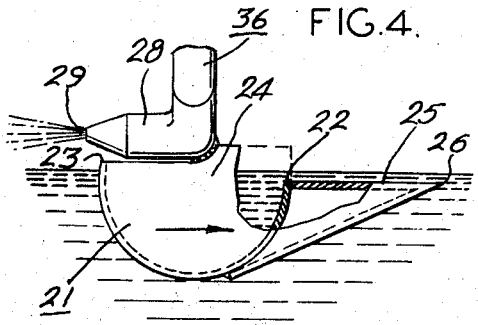
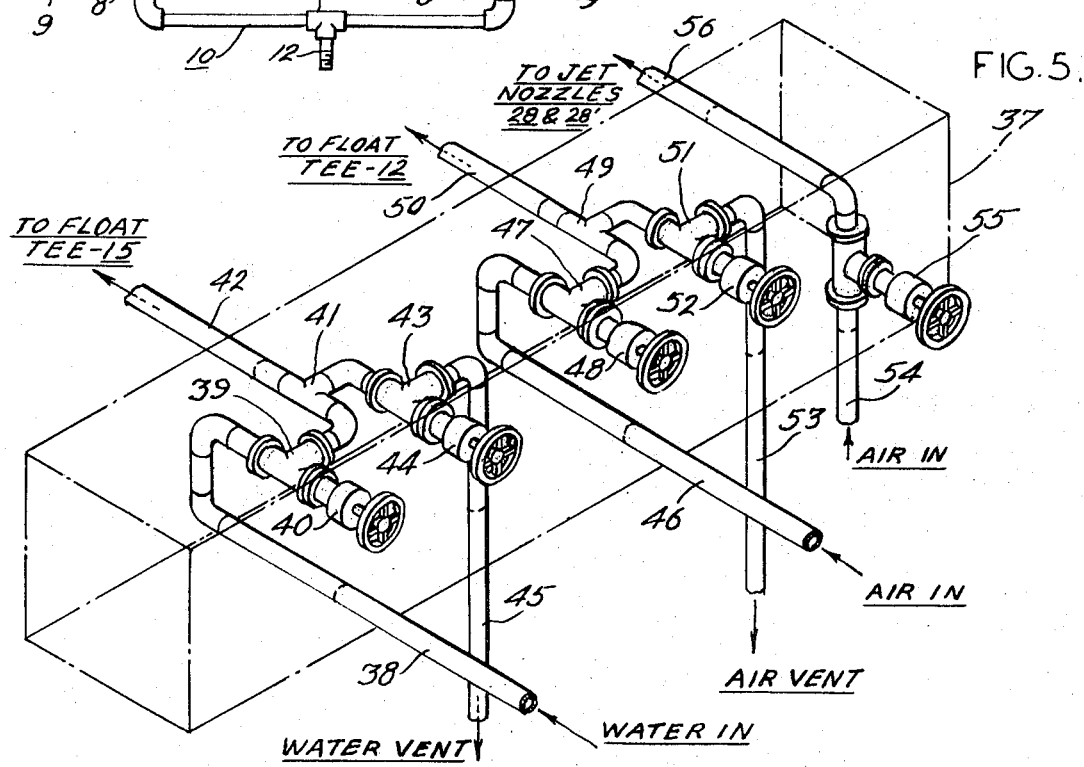

ROTARY SKIMMER

This invention relates to a device for removing floatable material from the surface of a liquid such as a relatively shallow body of water.

The waste water (effluent) from a petroleum refinery may typically be fed to a final settling pond before being released into a river or other flowing stream. It is necessary that any hydrocarbon (oil) remaining in this effluent be removed therefrom, before the effluent is discharged into the stream. It is possible to do this by a skimming operation, since the oil is lighter than the water and is immiscible therewith.

An object of this invention is to provide a novel skimming device, for removing floatable material from the surface of a liquid.

Another object is to provide a skimming device which is of relatively simple construction and therefore inexpensive, and is sufficiently light in weight to be easily transportable.

A further object is to provide a skimming device which has a compensating action whereby, irrespective of changes in the level of the liquid being skimmed, the skimming will take place at a pre-established depth below the surface.

An additional object is to provide a rotary skimmer having a simplified form of rotary driving means.

Still another object is to provide a skimming device which is readily portable, yet can be easily set up in a relatively fixed position in a body of liquid, to carry out a skimming operation.

The objects of this invention are accomplished, briefly, in the following manner: An elongated skimming blade, which is supported by means of a float in a body of water, is rotated about a substantially vertical axis just below the surface of the water, to skim the floatable material from the surface into a collection trough secured to the blade. The buoyancy of the float is adjustable, to adjust the position of the blade relative to the liquid surface. The layer of liquid collected in the trough as it rotates is pumped out by means of a suction pump connected to the trough.

A detailed description of the invention follows, taken in conjunction with the accompanying drawings, wherein:

FIG. 2 is a plan view of the skimming device;

FIG. 3 is a plan view showing a detail;

FIG. 4 is a side elevation looking in the direction 4—4 of FIG. 1; and

FIG. 5 is a schematic representation of a control panel for the skimming device of the invention.

Figure 1:
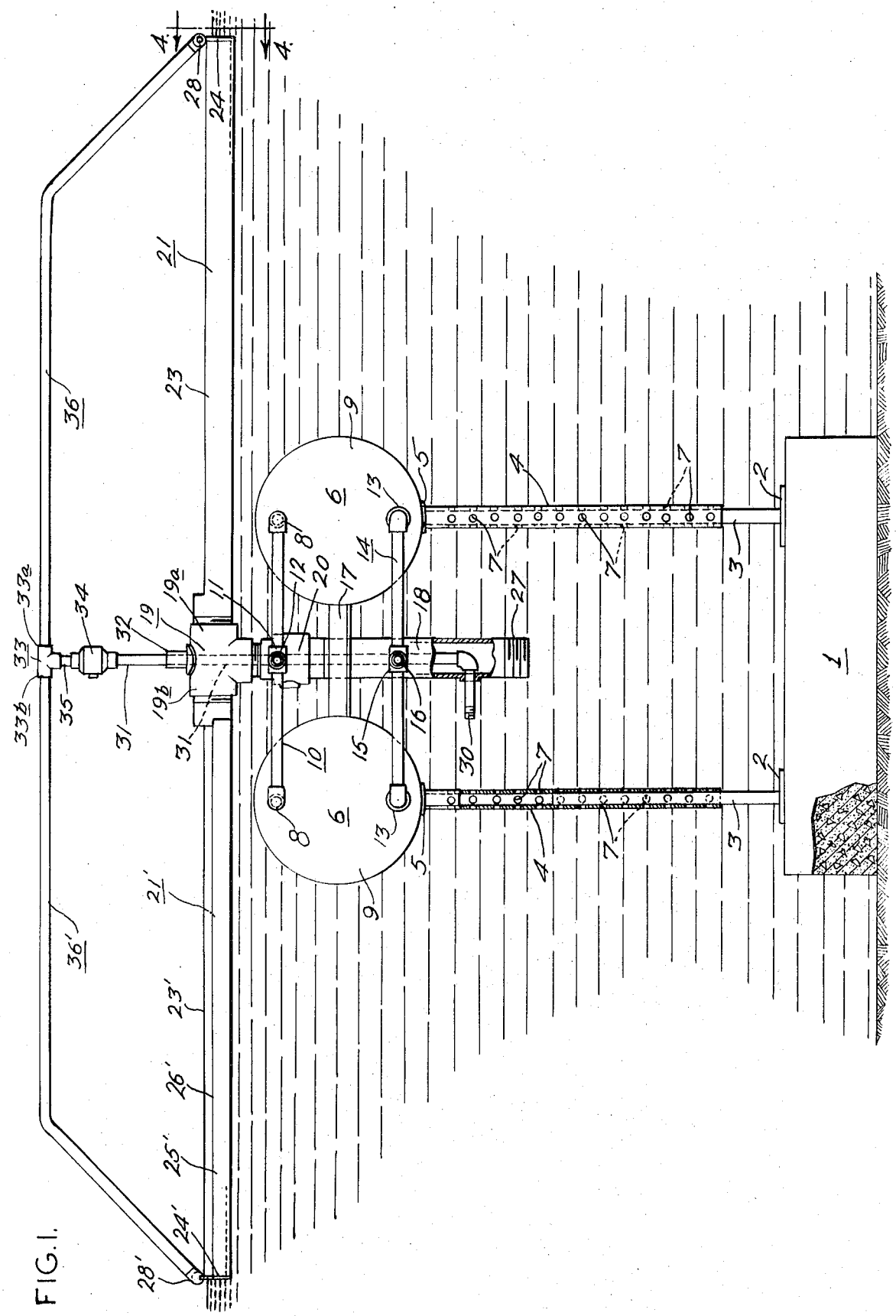
FIG. 1 is a front elevation of a skimming device according to this invention.

Referring now to the drawings, the portable rotary skimmer assembly of this invention is maintained in position, when it is "on location" for skimming purposes, by a deadman-type anchor 1 (preferably a concrete block having a weight of about 1,000 pounds) which rests on the bed of the body of liquid (water) being skimmed. By way of example, the dimensions of anchor 1 may be 4 × 1½ × 1 inch. A pair of mounting plates 2 (6 × 6 × ¼ inch) are secured to the upper surface of block 1, about 2½ feet apart, and a pair of upstanding support members 3 (each being a piece of one-inch aluminum pipe about 2½ feet in length) are secured at their lower ends one at the center of each respective plate 2. Each of the support members 3 fits telescopically within a respective tubular float-retaining member 4 the upper ends of which latter are secured to respective plates 5 which are in turn welded to the lower outer cylindrical surfaces of two respective drum-type floats 6. The float-retaining members 4 may be, for example, pieces of 1½ inch aluminum pipe about 5 feet long, while the plates 5 may have dimensions of 3 × 3 × ⅛ inch.

It may be seen that the arrangement 3, 4 forms a telescopic retaining means for the floats 6. The floats 6 may move vertically with respect to anchor 1 and members 3, while being restrained against lateral displacements. To facilitate the relative telescopic movements of pipes 3 and 4, a plurality of relief holes 7 (of one-half inch diameter) are drilled through the wall of the outer telescopic member 4, these holes preferably being staggered around the circumference of pipe 4, as illustrated in FIG. 1.

The floats 6 may have the form of ordinary thirty-gallon drums, and when the skimmer device of the invention is in operative position, the longitudinal axes of these drums extend substantially horizontally and in spaced, parallel relation to each other.

The buoyant force exerted by each of the buoyant means or floats 6 can be adjusted by varying the relative proportions of air and water inside the drums.

A three-fourths inch tapped hole 8 is provided in one circular head 9 of each respective drum 6, near the top thereof. A ¾ × ½ inch reducing bushing is mounted in each hole 8, and these two bushings are connected to a common air manifolding arrangement 10 made up from one-half inch aluminum piping and including at the center thereof a tee 11 to the side arm 12 of which a one-half inch hose connection (not shown) is made for either admitting air to the interior of the drums or venting air therefrom, in a manner which will be described further hereinafter.

A two-inch tapped hole 13 is provided in the head 9 of each respective drum 6, near the bottom thereof. A 2 × ½ inch reducing bushing is mounted in each hole 13, and these two bushings are connected to a common water manifolding arrangement 14 made up from one-half inch aluminum piping and including at the center thereof a tee 15 to the side arm 16 of which a one-half inch hose connection (not shown) is made for either admitting water to the interior of the drums or discharging (draining) water therefrom, in a manner which will be described further hereinafter.

The floats 6 serve to support the actual skimming elements in position in the body of water being skimmed. Two pieces 17 of 2 × 2 × ¼ inch aluminum angle are butt-welded at their opposite ends to the respective floats 6, these angle pieces being located in spaced, parallel relation to each other, between the two floats, and on the horizontal transverse center line of the floats. See FIG. 3. A piece of aluminum pipe 18, 4 inches in diameter, is positioned between the two angle pieces 17 and is welded thereto, this pipe passing substantially vertically through the space between these angle pieces.

A four-inch aluminum tee 19 is rotatably mounted at the upper end of pipe 18 by means of a 4 inch swivel joint 20 which is coupled between the side arm of such tee and the upper end of pipe 18, the coupling between the swivel joint and the tee preferably including a close nipple (not numbered in FIG. 1). The tee 19 is thus mounted for rotation about a substantially vertical axis of rotation (which axis is established as the center line of pipe 18). In operation, the tee 19 (and other elements rotating therewith, to be later described) is intended to rotate in a counterclockwise direction (viewing the apparatus of FIG. 1 from above the same).

A collecting trough 21, which serves as an accumulation means for floatable material skimmed from the liquid surface, is secured to one "straight" arm 19a of the tee 19. The trough 21 is made from a length of 4 inch aluminum pipe, approximately 6 feet long. For a distance of a few inches from one end, the length of pipe is unmodified, so that this end of the pipe may be threaded into the tee arm 19a to securely couple the trough to the tee 19, for support purposes. The remainder of the length of pipe is formed into an approximately semicylindrical trough, by making two oppositely-disposed longitudinally-extending saw cuts in the pipe and removing (and discarding) the upper one-half of the pipe. Along one edge 22, which may be termed the front edge, the longitudinal cut is made in a plane passing through the pipe axis (see FIG. 4), while along the opposite edge (rear edge) 23, the longitudinal cut is made in a plane parallel to that of cut 22 but one-half inch above the pipe axis; thus, the resulting trough 21 is slightly more than semi-cylindrical and its rear wall 23 is higher than its front wall 22, as illustrated in FIG. 4.

The outer end of trough 21 (opposite to the tee 19) is closed by means of a closure plate 24 (one-eighth inch aluminum plate), which is welded on this end of the trough. The closure plate 24 comprises slightly more than half of a complete circular disk. The bottom half of plate 24 matches the curvature of the pipe-derived trough, while at its upper rear quarter the edge of the plate is aligned with trough rear edge 23; at its upper front quarter the edge of the plate 24 is parallel to trough rear edge 23 but is spaced a small distance thereabove.

An elongated skimming blade 25, having a pointed outer edge 26, is welded to the front edge 22 of trough 21. This blade is made of one-eighth inch aluminum plate bent into the shape illustrated in FIG. 4, and has a length coextensive with the cut length of trough 21. The planar upper face of blade 25 extends outwardly from trough forward edge 22, and is coplanar with this forward edge. This upper face may extend about 3¼ inches outwardly from trough 21.

A collecting trough 21', similar in construction to trough 21 but of opposite hand, is secured to the other "straight" arm 19b of the tee 19. Elements of trough 21' which are similar to those of trough 21, previously described, are denoted by the same reference numerals but carrying prime designations. The outer end of trough 21' is closed by means of a closure plate similar in construction to plate 24, previously described. An elongated skimming blade 25', similar in construction to blade 25, is welded to the front edge 22' of trough 21'.

As will be detailed subsequently, the trough-skimmer blade-tee assembly 21, 21', 25, 25', 19 is rotated in a counterclockwise direction (viewing the apparatus of FIG. 1 from above the same), at a slow rate, about a substantially vertical axis established as the center line of pipe 18. The skimming blades 25 and 25' are supported in the liquid being skimmed, with the blades at a predetermined depth below the liquid surface. The layer of liquid skimmed off by the blades, as they move across the surface of the liquid, is collected in the accumulation means or troughs 21 and 21'; it flows downwardly through the downwardly-extending pipe 18, which acts as a drain connected (via tee 19 and swivel joint 20) to the center of the composite or dual trough 21, 21'. The lower end of pipe 18 is threaded as at 27, to serve as a four-inch connection for a flexible hose (not shown) which goes to a suction pump (also not shown). The aforementioned pump pumps the skimmed-off material (floatable material, such as oil) from pipe 18 to a suitable location, such as a storage tank.

For rotating the trough-skimmer blade-tee assembly in the manner described, a pair of jet propulsion devices (air jets) are utilized, one such device secured to the outer end of each respective trough 21 and 21'. A three-fourths inch jet nozzle 28, whose discharge jet opening 29 is directed rearwardly (i.e., toward and beyond the rear edge 23 of the trough 21), is secured as by welding to the upper edge of closure plate 24 (see FIG. 4). Thus, gas under pressure supplied to the jet 28 (and issuing from opening 29) exerts a force on plate 24 (and trough 21) which pushes this trough in the forward direction (namely, toward the right in FIG. 4). A similar jet nozzle 28', whose discharge jet opening is directed rearwardly (i.e., toward and beyond the rear edge 23' of the trough 21'), is secured as by welding to the closure plate at the outer end of trough 21'. Gas under pressure supplied to jet 28' exerts a force on trough 21' which pushes this trough in the forward direction (i.e., in a counter-clockwise direction when viewing the apparatus of FIG. 1 from above the same). The two jets 28 and 28' thus act in the same sense on the trough-skimmer blade-tee assembly.

Compressed air is supplied to the jets 28 and 28' by way of a three-fourths inch hose connection (not shown) which is made to the outer end 30 of a three-fourths inch aluminum pipe 31 which is positioned coaxially within pipe 18 (and which thus extends vertically) and whose outer end 30 is sealed through the wall of pipe 18, near the lower end 27 of the latter. The pipe 31 extends vertically up through the side arm of tee 19 and thence through a suitable hole provided in the opposite wall of the tee, at which latter location a bronze guide bushing 32 is welded to the tee 19. The pipe 31 extends through the bushing 32, which provides a bearing surface for the rotation of tee 19 with respect to the stationary or fixed pipe 31. A suitable hydraulic grease fitting (not shown) is preferably provided in bushing 32, for lubrication of this bushing.

A three-fourths inch tee 33 is rotatably mounted at the upper end of pipe 31 by means of a three-fourths inch swivel joint 34 which is coupled to the side arm of such tee through a close nipple 35; the swivel joint 34 is also, of course, coupled to the upper end of pipe 31. From one "straight" arm 33a of tee 33, piping which is denoted generally by numeral 36 extends outwardly and downwardly to the jet nozzle 28, for carrying air from the air feed pipe 31 to this nozzle. From the other "straight" arm 33b of tee 33, piping which is denoted generally by numeral 36' extends outwardly and downwardly to the jet nozzle 28', for carrying air from the air feed pipe 31 to this latter nozzle. It should be apparent that the piping 36 and the piping 36' rotate along with tee 33 and the nozzles 28 and 28', as the latter rotate the trough-skimmer blade-tee assembly about the substantially vertical axis established as the center line of pipes 18 and 31.

Refer now to FIG. 5, which illustrates a control panel for the rotary skimmer of this invention. Various valves, pipe fittings, and pipes (to be later detailed) are mounted in a box-like cabinet or housing 37 shown in dot-dash lines. A water supply or inlet pipe 38, carrying water under pressure, is coupled through a tee fitting 39 (which is under the control of a bronze angle needle valve 40, operable from outside the housing) and through another tee fitting 41 to a one-half inch hose connection 42 which goes to the side arm 16 of the float (water) tee 15 (FIG. 1). From the tee 41, a fluid coupling extends through a tee fitting 43 (which is under the control of a bronze angle needle valve 44, operable from outside the housing) to a water vent pipe 45, which goes to a suitable vent or drain.

An air supply or inlet pipe 46, carrying compressed air, is coupled through a tee fitting 47 (which is under the control of a bronze angle needle valve 48, operable from outside the housing) and through another tee fitting 49 to a one-half inch hose connection 50 which goes to the side arm 12 of the float (air) tee 11. From the tee 49, a fluid coupling extends through a tee fitting 51 (which is under the control of a bronze angle needle valve 52, operable from outside the housing) to an air vent pipe 53, which goes to a suitable air venting means.

By suitable operation of the valves 40, 44, 48, and 52, the buoyant force exerted by the floats 6 may be adjusted, thereby to position the skimming blades 25 and 25' at any desired preselected depth below the surface of the liquid being skimmed. For example, if valves 40 and 52 are opened (valves 44 and 48 being closed), additional water is admitted to the lower portions of the floats 6 and air is vented from the upper portions of the floats, decreasing their buoyancy and causing them to sink. On the other hand, if valves 44 and 48 are opened (valves 40 and 52 being closed), additional air is admitted to the floats 6, venting water therefrom, thus increasing their buoyancy and causing them to rise. In this way, the depth of skimming (below the liquid surface) may be easily adjusted or varied. In this connection, it may be noted at this point that the upper portions of the outer walls of floats 6 are located at a fixed distance (typically, one inch) below the lower surfaces of the rotating troughs 21 and 21'.

The use of floats 6 for supporting the operating parts of the skimmer, together with the telescopic arrangement 3, 4, causes the skimming blades to move up or down as the liquid level rises or falls, thus maintaining these blades at a predetermined depth relative to the (changing) liquid level. It will be appreciated that the telescopic arrangement 3, 4 permits the floats 6 to move up or down relative to the anchor 1, and that the skimming troughs 21 and blades 25 are attached to the floats by means of pipe 18, etc., so that they move up or down with the floats.

An air supply or inlet pipe 54, carrying compressed air, is coupled through a conventional control valve 55 (operable from outside the housing) to a three-fourths inch hose connection 56 which goes to the outer end 30 of pipe 31. The valve 55 thus serves to control the flow of compressed air to the jet propulsion devices 28 and 28', which (as previously described) cause rotation (in substantially a horizontal plane) of the skimming blades 25, 25', together with their attached collection troughs 21, 21'.

The invention claimed is:

1. A device for removing floatable material from the surface of a body of water comprising means establishing a substantially vertical axis, an elongated skimming blade penetrating the surface of the water and supported for rotation about said axis in a predetermined direction, an accumulation means secured to the trailing edge of said blade and rotating therewith, buoyant means supporting the blade and accumulation means and also said axis in the water with the blade at a predetermined depth below the water surface, means for anchoring said buoyant means at a fixed location in said body of water, means for rotating the blade about said axis, and means for withdrawing material from said accumulation means.

2. A device for removing floatable material from the surface of a liquid comprising means establishing a substantially vertical axis, a pair of elongated skimming blades each extending substantially radially outwardly from said axis and in substantially diametrically opposite directions, each skimming blade penetrating the surface of the liquid and being supported for movement across the surface thereof in a predetermined direction; an accumulation means secured to the trailing edge of each blade and moving therewith, buoyant means supporting the blades and accumulation means in said liquid with the blades at a predetermined depth below the liquid surface, means for anchoring said buoyant means at a fixed location in said liquid, means for rotating the blades bodily as a unit about said axis, and means for withdrawing material from said accumulation means.

3. Device according to claim 2, wherein the blade rotating means comprises separate jet propulsion devices secured respectively to the outer end of each rotating assembly of skimming blade and accumulation means, and means for supplying gas under pressure to said propulsion devices to provide jet motive forces.

* * * * *